United States Patent [19]

Paurat et al.

[11] Patent Number: 4,499,993
[45] Date of Patent: Feb. 19, 1985

[54] BELT-TYPE BULK-MATERIAL CONVEYOR FOR UNDERGROUND USE

[76] Inventors: Friedrich W. Paurat, Kasselweg 29; Roland Paurat, Blumenstr. 11, both of 4230 Wesel, Fed. Rep. of Germany

[21] Appl. No.: 461,534

[22] Filed: Jan. 27, 1983

[30] Foreign Application Priority Data

Jan. 28, 1982 [DE] Fed. Rep. of Germany ....... 3202719
Apr. 15, 1982 [DE] Fed. Rep. of Germany ....... 3213803

[51] Int. Cl.³ .............................................. B65G 15/08
[52] U.S. Cl. .................................................... 198/819
[58] Field of Search ................................ 198/818, 819

[56] References Cited

FOREIGN PATENT DOCUMENTS

| H18736 | 4/1956 | Fed. Rep. of Germany . | |
|---|---|---|---|
| 965024 | 3/1957 | Fed. Rep. of Germany | 198/819 |
| 11632 | 11/1952 | German Democratic Rep. . | |
| 733714 | 7/1955 | United Kingdom | 198/818 |
| 746793 | 3/1956 | United Kingdom | 198/819 |
| 1296150 | 11/1972 | United Kingdom | 198/819 |

OTHER PUBLICATIONS

"Fordern und Heben", vol. 9, p. 571, (1954).
"Fordern und Heben", vol. 9, p. 640, (1962).

*Primary Examiner*—Joseph E. Valenza
*Assistant Examiner*—Douglas C. Voorhees
*Attorney, Agent, or Firm*—Karl F. Ross

[57] ABSTRACT

A conveyor for transporting bulk material mainly underground along a closed path traversing at least one loading or unloading zone has a mainly one-level track on the path. This track has a one-level main rail following the path outside the zone and having ends at the zone, respective one-level Y-intersections at the zone each having a central leg connected to the respective rail end and right and left arms extending into the zone, and respective right and left rail branches at the zone extending from the right and left arms of the one Y-intersection to the right and left arms of the other intersection and spaced apart transversely of the path. An endless conveyor belt extends along the path and through the zone and has right and left longitudinal edges. Respective endless rows of longitudinally spaced right and left trucks alternate with one another along the path and each have a lower end attached to the respective belt edge and an upper end riding on and displaceable longitudinally in the main rail. An endless and flexible tension-transmitting drive element extends along the path and through the zone and is connected at least indirectly to the belt and trucks. A drive connected to the drive element advances the belt and trucks along the path in a transport direction. A deflector at the upstream Y-intersection forces the right trucks into its right arm and then into the right branch and forces the left trucks into its left arm and then into the left branch. The belt is closed and tubular outside the zone when its right and left trucks are all in the main rail and is open in the zone when the right trucks are in the right branch and the left trucks are spaced therefrom in the left branch.

19 Claims, 16 Drawing Figures

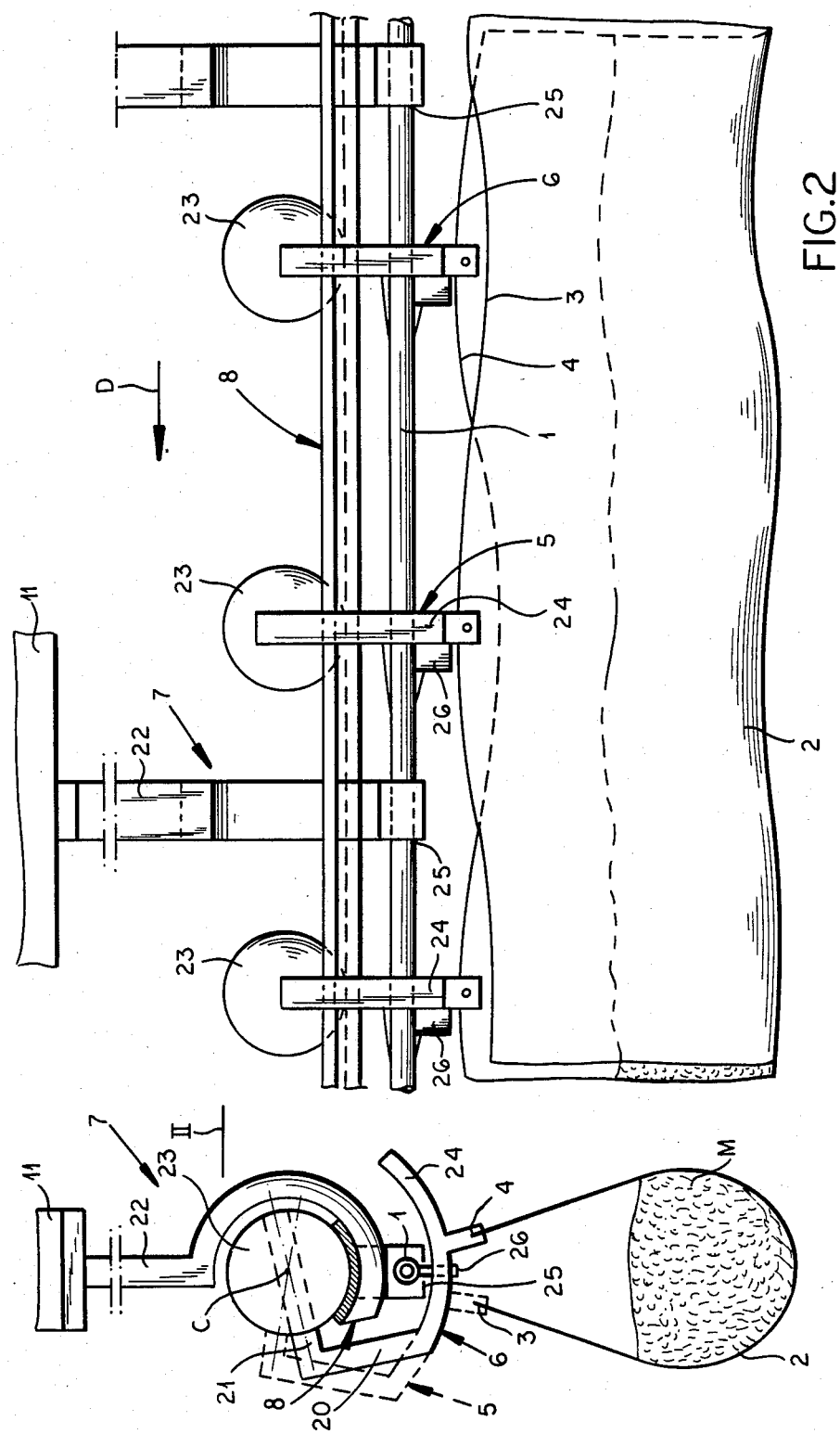

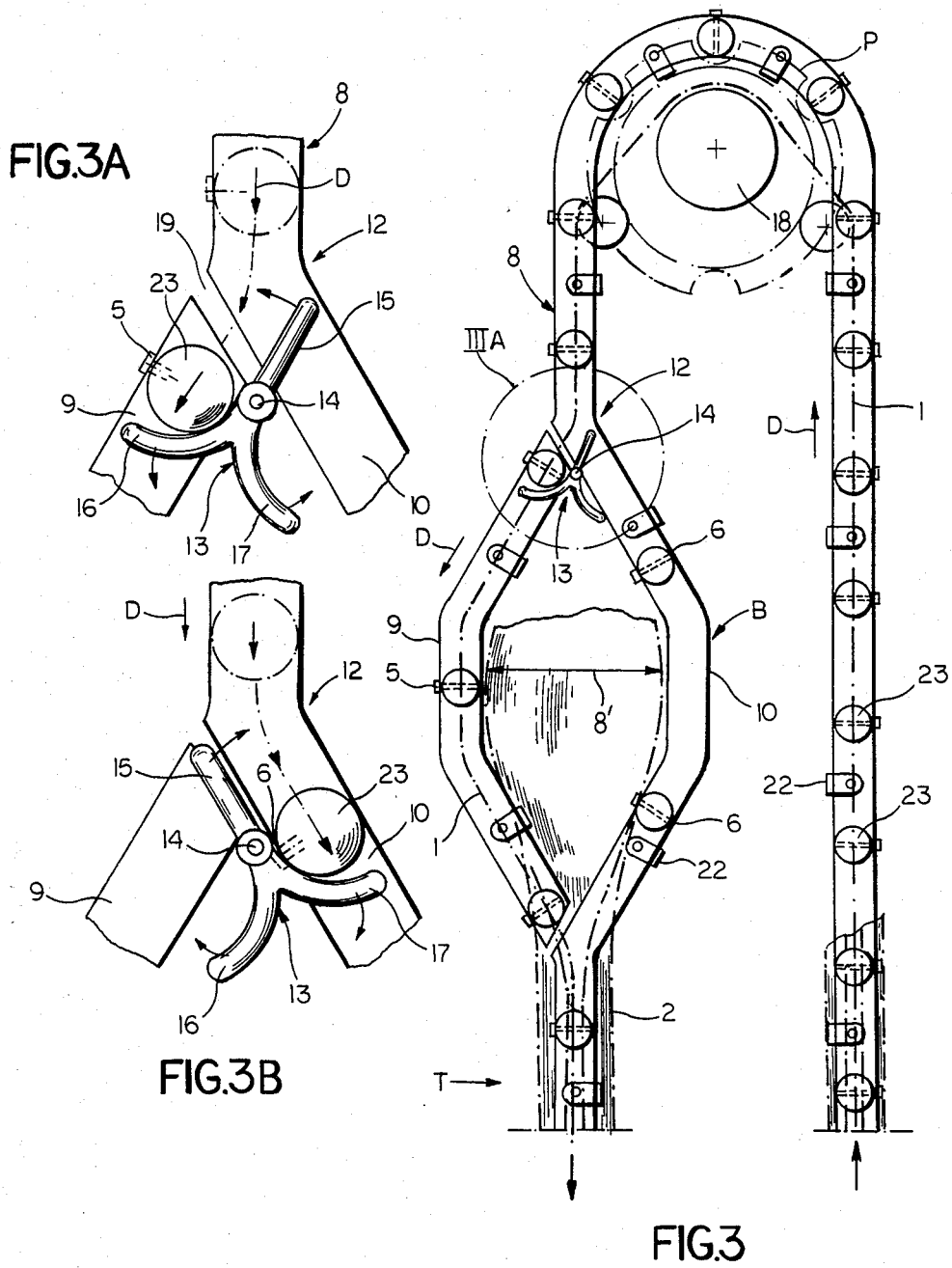

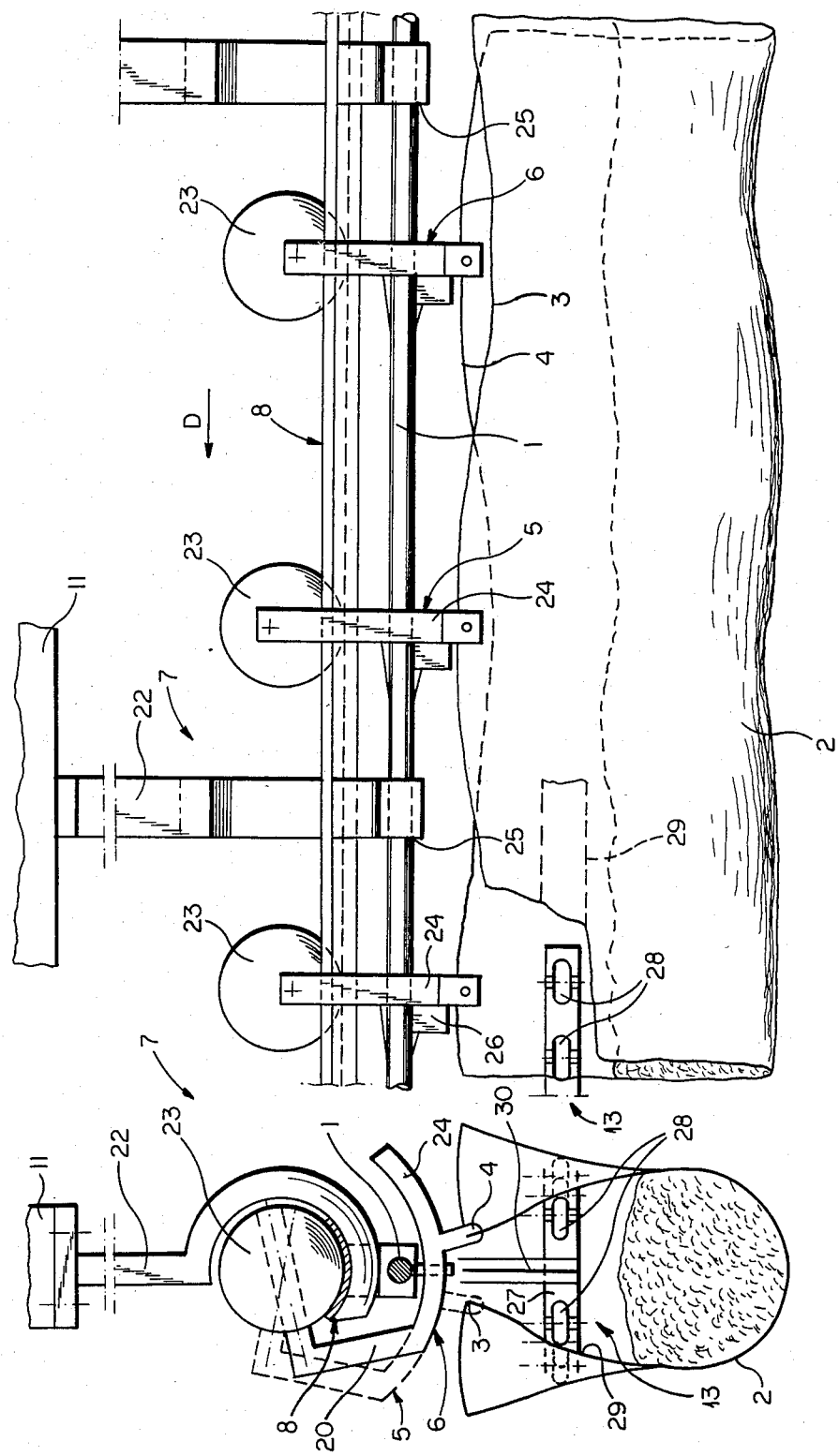

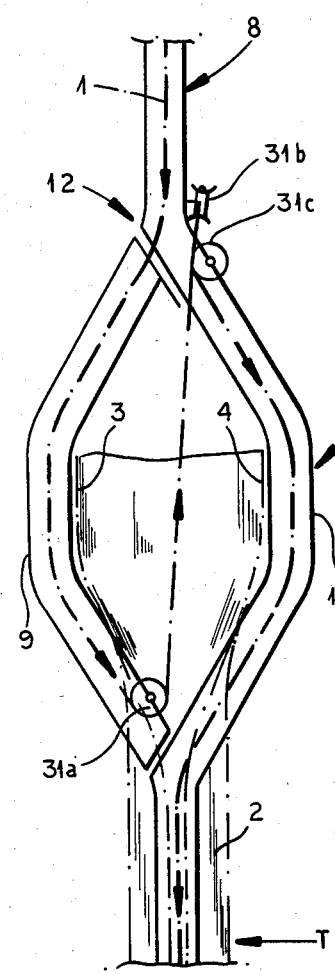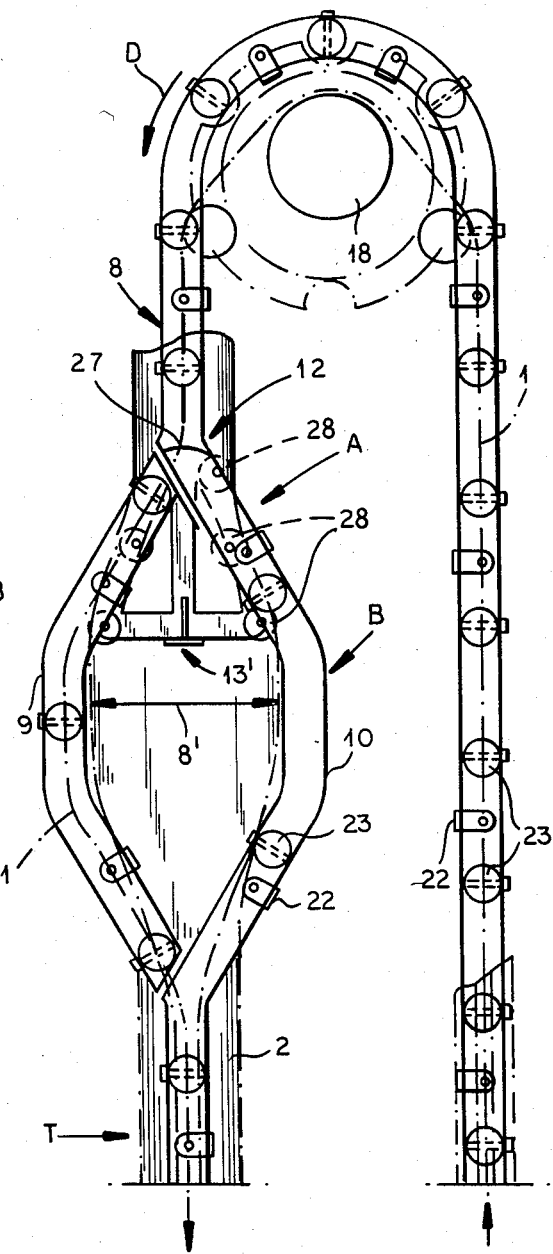
FIG.11
FIG.9

BELT-TYPE BULK-MATERIAL CONVEYOR FOR UNDERGROUND USE

FIELD OF THE INVENTION

The present invention relates to a belt-type bulk-material conveyor. More particularly this invention concerns such a conveyor used to transport ore, coal, and the like within and out of a mine.

BACKGROUND OF THE INVENTION

A heavy-duty belt-type conveyor for transporting bulk material mainly underground along a closed path traversing at least one loading or unloading zone is known which has a track on the path and including a main rail following the path outside the zone and having ends at the zone, respective intersections at the zone connected between the rail ends and respective right and left rail branches extending between the intersections. An endless conveyor belt extends along the path and through the zone and has right and left longitudinal edges provided with respective endless rows of longitudinally spaced right and left trucks alternating with one another along the path and each having a lower end attached to the respective belt edge and an upper end riding on and displaceable longitudinally in the rail. An endless and flexible tension-transmitting drive element extends along the path and through the zone and is connected at least indirectly to the belt and trucks. A drive is connected to the drive element for advancing the belt and trucks along the path in a transport direction. Relative to the transport direction, at the upstream intersection the right trucks pass into the right branch and the left trucks into the left branch. The belt is closed and tubular outside the zone when its right and left trucks are all in the main rail and is open in the zone when the right trucks are in the right branch and the left trucks are spaced therefrom in the left branch. The rails can be rigid, or can even be cables (see Foerdern und Heben, 1954, p. 571, Fig. 12).

With this system it is therefore possible to load material onto the open belt at the zone or unload it therefrom, but outside the zone or zones the belt is closed. When thus closed it occupies minimal space and the normally dusty bulk material is enclosed. The belt can be provided with internal transverse partitions so it can even move vertically.

Such a system, as described in West German Pat. No. 965,024 as well as in East German Pat. No. 11,632, can have trucks each provided with a main lower roller that rides on the main rail outside the zone. The trucks attached to the one edge, for example the left edge, are also each provided above the main roller with a separate deflection roller. At the intersection at the upstream end of the loading or unloading zone the left branch has an input end positioned above the main rail to catch and engage these upper rollers. The main rail is constructed to permit the main rollers of the left trucks to move at the upstream and downstream intersections transversely between the main rail and the left branch. The main rail extends continuously through the zone to form the right branch while the upper left branch diverges from it and converges with it. Plainly such mechanism is relatively complex and failure-prone. When for some reason a left truck does not catch, the belt does not open so it cannot unload or be loaded.

A conveyor of this general type is also known, as for example from Foerdern und Heben (1962 page 640) or from commonly assigned copending U.S. patent application No. 385,065 filed June 4, 1982, which has a plurality of guides carrying an endless conveyor belt having a horizontal intake stretch, a vertical transport stretch following the intake stretch, a horizontal output stretch following the transport stretch, and a return stretch extending from the output stretch to the intake stretch. Drive means is connected to the edges for advancing the belt in a transport direction from the intake stretch through the transport stretch to the output stretch and then back through the return stretch to the intake stretch. Closing means at the intake stretch moves the belt edges from a spaced-apart position with the belt open therebetween to a juxtaposed position with the belt tubular. Thus the belt is tubular as it enters the transport stretch. Opening means at the output stretch moves the belt edges from the juxtaposed position to the spaced-apart position. Thus the belt is flattened out at the output stretch. Bulk material loaded onto the flattened-out belt in the intake station is transported by the belt through the vertical stretch and discharged from the belt at the output stretch.

In such a system the belt edges are joined and separated like a slide fastener so they very securely surround the bulk material being transported and allow the belt to work even perfectly vertically, to which end the belt has internal transverse partitions to prevent the load from slipping back down inside itself.

A relatively foolproof belt-type conveyor is also described in German patent application No. H 18,736 SI/81e which has separate and endless right and left rails that are immediately adjacent each other outside the loading and unloading zones, but that are separated at these zones. Such a system is quite expensive to make and maintain due to the duplication of parts, although it normally can be counted on to work well.

OBJECTS OF THE INVENTION

It is therefore an object of the present invention to provide an improved belt-type bulk-material conveyor for mine use.

Another object is the provision of such a belt-type bulk-material conveyor for mine use which overcomes the above-given disadvantages.

A further object is to provude such a conveyor which is simple and inexpensive to manufacture, yet which functions reliably.

SUMMARY OF THE INVENTION

These objects are attained according to the instant invention in a conveyor for transporting bulk material mainly underground along a closed path traversing at least one loading or unloading zone having a mainly one-level track on the path. This track has a one-level main rail following the path outside the zone and having ends at the zone, respective one-level Y-intersections at the zone each having a central leg connected to the respective rail end and right and left arms extending into the zone, and respective right and left rail branches at the zone extending from the right and left arms of the one Y-intersection to the right and left arms of the other intersection and spaced apart transversely of the path. The rail branches are of construction similar to the main rail and may be vertically offset from each other between the intersections. An endless conveyor belt extends along the path and through the zone and has right and left longitudinal edges. Respective endless rows of longitudinally spaced right and left trucks alternate with one another along the path and each have a lower end attached to the respective belt edge and an upper end riding on and displaceable longitudinally in the main rail. The trucks are all of substantially the same vertical dimension and of generally identical construction. An endless and flexible tension-transmitting drive element extends along the path and through the zone and is connected at least indirectly to the belt and trucks. Drive means connected to the drive element advances the belt and trucks along the path in a transport direction. Deflector means at, relative to the transport direction, the upstream Y-intersection forces the right trucks into its right arm and thence into the right branch and forces the left trucks into its left arm and thence into the left branch. The belt is closed and tubular outside the zone when its right and left trucks are all in the main rail and is open in the zone when the right trucks are in the right branch and the left trucks are spaced therefrom in the left branch.

With this system, therefore, the rail need only be double at the loading and unloading zones, and all of the trucks are simple ones riding on a one-level rail system, by which is meant a system where except at the zone there is only one rail for all the trucks. The trucks need not be provided with complicated double-roller arrangements and are all substantially identical for both the right and left edges of the belt so production costs for this item can be low.

The deflector means includes a deflector element displaceable between a left position blocking the left arm of the upstream intersection and a right position blocking the right arm thereof. This movement can be effected by an actuator, such as an electric motor controlled by an upstream proximity switch. It is also possible for the deflector element to be engageable by the trucks in the arms of the upstream intersection.

In this case the deflector element is pivotal about an axis transverse to the path at the intersection and has an upstream deflector flap pivotal between the left and right positions and right and left downstream deflector tabs. The right flap extends across the right arm of the intersection when the upstream flap is in the left position and the left flap extends across the left arm of the intersection when the upstream flap is in the right position. The pivot axis lies between the arms of the upstream intersection and immediately downstream of the leg thereof. This system is extremely simple, yet can be counted on to function perfectly for a long time without mechanical breakdown.

According to the invention the rail, the central legs and the arms of the intersection are all of upwardly open U-section. In this manner all forces can be neatly centered above the center of the rail so the system can easily support considerable loads. In addition this arrangement makes the belt self-closing.

It would also be possible to use permanent sintered-type magnets at the upstream intersection directed across the fork. The cars would carry their own magnets that would be appropriately oriented to draw the respective cars toward or push them away from these stationary magnets. Electromagnets could also be used, linear-motor or solenoid fashion.

In accordance with another feature of this invention the right and left trucks include respective generally C-shaped right and left hangers each having the respective upper and lower ends and respective rollers rotatable on the upper ends about generally horizontal axes and riding in the main rail outside the zone. These rollers are all in line without substantial transverse spacing in the main rail outside the zone. Hence the system is very compact. For automatic roller centering, the rollers are balls and the main rail is of upwardly open part-circular section of the same radius of curvature as the balls. In addition the C-shaped hangers are all open horizontally toward one of the right and left edges and the main rail and branches are hung on suspenders on the side thereof above the one edge toward which the C-shaped hangers are open. Thus these normally J-shaped hangers can move past the suspenders.

The belt according to the invention is flexible but stiff and the right hangers extend down and to the right from the respective rollers and the left hangers extend down and to the left from the respective rollers. The lower ends of the left hangers are spaced horizontally to the left relative to the direction from the lower ends of the right hangers outside the zone, it being understood that the terms "right" and "left" are here used only to establish relative positions from the belt center and have no absolute meaning.

It is also possible for the deflector means to have a splitter between the arms of the upstream intersection and positioned below the rail generally between the edges of the belt. This splitter is a wedge pointed horizontally upstream and having right and left flanks generally under the right and left arms of the upstream intersection. The right and left flanks are immediately underneath the respective right and left belt edges, are engageable with the belt thereat, and are provided with roller elements engaging the belt. To maximize equipment life, the belt is provided on its inside underneath each of its edges with a wear-resistant bumper strip engaging the respective wedge flank. This arrangement can be counted on to work perfectly for a very long service life as it has no critical moving parts.

The track according to the invention is provided with guides formed with generally downwardly directed slots. The drive element is received in these guides and has respective entrainment elements engageable through the respective slots with the trucks. In this manner the drive element is very solidly connected to the belt all along its length.

One of the branches is also provided with such guides. Thus the drive element engages the trucks of this one branch. It is also possible for the conveyor of this invention to have means for guiding the drive element from the downstream end of the one branch to the upstream end of the other branch and thence therealong to the downstream intersection. In this arrangement the drive element engages the trucks in both branches. This guiding means includes deflector wheels over which the drive element is looped.

The system of this invention is quite simple, yet can be counted on to carry very heavy loads for long periods without breakdown. It is ideally suited to use in a mine or other underground environment where simple but robust and compact equipment is required.

DESCRIPTION OF THE DRAWING

The above and other features and advantages will become more readily apparent from the following, reference being made to the accompanying drawing in which:

FIG. 1 is a cross-section through the bulk-material conveyor according to this invention;

FIG. 2 is a side view taken in the direction of arrow II of FIG. 1;

FIG. 3 is a small-scale top view of the system of FIG. 1; FIG. 3A is a medium-scale view of the detail indicated at IIIA in FIG. 3;

FIG. 3B is a view like FIG. 3A but showing the truck deflector in a different position;

FIGS. 7 and 8 are views similar to FIGS. 1 and 2 illustrating a second bulk conveyor according to this invention;

FIGS. 9 and 10 are views similar to respective FIGS. 3 and 6 of the second conveyor of the present invention; and FIG. 11 is a view like a portion of FIG. 9 showing an alternate form of drive arrangement for the conveyor according to this invention.

SPECIFIC DESCRIPTION

Figure 4D:
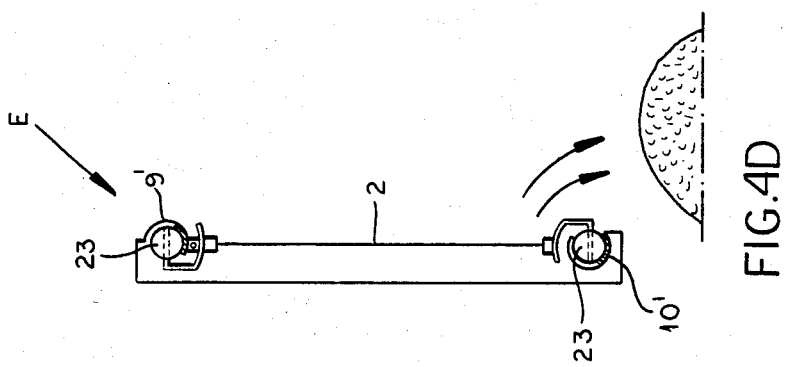
FIGS. 4A, 4B, 4C, and 4D are small-scale largely schematic cross-sections through the conveyor of this invention respectively at a loading station, somewhat upstream of an unloading station, immediately upstream of the unloading station, and at the unloading station.

As seen in FIGS. 1–3 the bulk conveyor according to this invention has an endless flexible drive element 1, here a steel cable, that moves along an annular path indicated at dot-dash line P to entrain a conveyor belt 2 that is also endless and that has two longitudinal edges 3 and 4 that extend along the path also. Respective roller trucks 5 and 6 suspend the edges 3 and 4 from a track 7 having a main rail 8 carried on a frame or hanger support 11. At a loading zone B the track 7 splits into two branch rails 9 and 10 spaced transversely by a distance 8'. Similarly in an unloading zone E shown in FIG. 4D the rail 8 of the track 7 splits into two branches 9' and 10'.

Figure 4C:
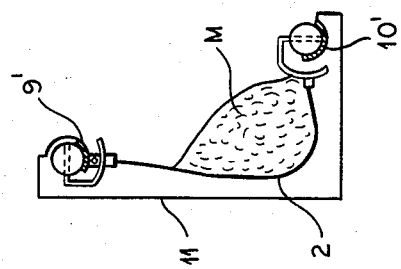
Figure 4B:
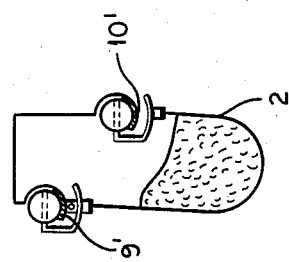

The trucks 5 and 6 are formed by C-shaped hangers 20 each having a straight upper arm 21 forming a diametral central pivot for a ball roller 23 and an arcuate lower arm 24 with a center of curvature in the center C of the respective ball roller 23 and connected to the respective edge 3 or 4 at a location lying on a plane including the center C and perpendicular to the arm 21. The roller ball 23 rides on the upwardly concave and U-shaped track 8, which is formed like the branches 9, 9', 10, and 10' and which is of the same radius of curvature as the balls 23. The track branch 10' as seen in FIGS. 4B–4D moves from an upwardly concave position to a laterally and then downwardly concave one and then back as it passes the unloading zone E. The other rails 8, 9, 9', and 10 all remain upwardly concave at all times. J-shaped suspenders 22 that interfit with and allow the C-shaped hangers 20 to pass suspend the rails 8, 9, 9', and 20, but the rail 10' can be suspended from below as illustrated. The C-shaped hangers 24 are open toward the left, as seen in the travel direction, and the J-shaped suspenders 22 to the right, so they can pass each other.

The belt 2 is moved along the path P by means of the drive element 1 which passes through guides 25 that have downwardly open slots down through which entrainment tabs 26 fixed on the cable 1 project. The lower arms 24 of the belt hangers 20 are engaged and pushed along by these tabs 26. At a turnaround end of the conveyor according to the invention the cable 1 is not held in guides 25, but is spanned around a drive sprocket 18. In addition at the loading zone B and unloading zone E the guides 25 are provided on the hangers 22 for the rails 9 and 9'. With such a system the drive element 1 is connected to the belt 2 along its entire length so it is put under minimal tension. Drive stations can be provided at several locations along the path P.

Figure 5:
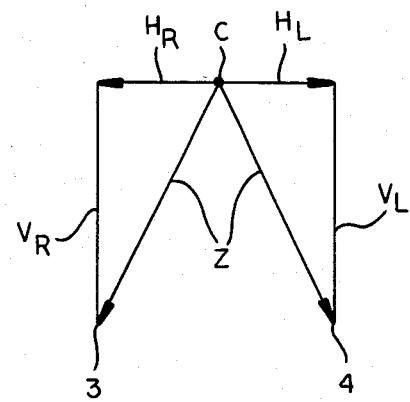
FIG. 5 is a vector diagram illustrating the invention.

In the transport zone T where the conveyor merely is moving the material from one place to another the trucks 5 and 6 are interleaved, that is they alternate, on the main rail 8 as shown in FIG. 1 so that the belt 2 is a virtually closed U-shape or tube. As shown in FIG. 5 the diagonal tensions Z in the hangers 20 extend from the horizontally spaced edges 3 and 4 of the belt and another end at the center C of the respective ball roller 23. These forces Z resolve into right- and left-hand vertical components $V_R$ and $V_L$ and horizontal components $H_R$ and $H_L$. The belt 2 is sufficiently stiff that it bellies out as seen in FIG. 1. Since the forces all resolve to the center C, which itself is inherently centered under the hangers 2, the system can easily carry a considerable load. All forces are in tension so relatively light construction can be used. Bending forces tending to flatten out the U-section guide are effective over a very short distance so they can easily be countered without having to employ massive construction.

Figure 4A:
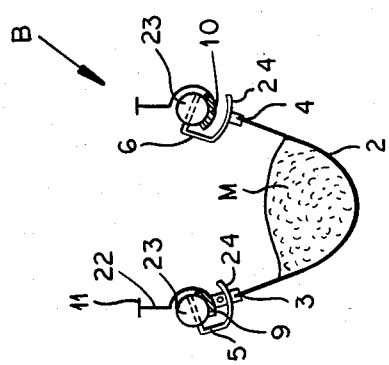

In the loading zone B as shown in FIGS. 3 and 4A the trucks 5 are deflected by a mechanism described in more detail below into the one branch 9 while the trucks 6 are deflected into the other branch 10. As they move apart they therefore open up and spread out the belt 2 so it can receive material M to be conveyed. As the belt 2 moves out of the zone B it is closed up as the two branches 9 and 10 converge and reunite, again interleaving the trucks 5 and 6.

As the closed-up belt 2 moves into the unloading zone E shown only in FIG. 4D the rail 8 splits into a pair of branches 9' and 10' which separate slightly horizontally and also vertically from a slightly vertically offset position shown in FIG. 4B somewhat upstream of the zone E to a substantially vertically and horizontally offset position as shown in FIG. 4C. Finally the trucks 5 and 6 are moved into a position in the zone E in which they are vertically superposed and the belt 2 is tight between them. In this latter position the bulk material M carried by the belt 2 is dumped from it. The rails 9' and 10' then reconverge in a manner opposite the progression from FIG. 4B to 4D.

Figure 6:
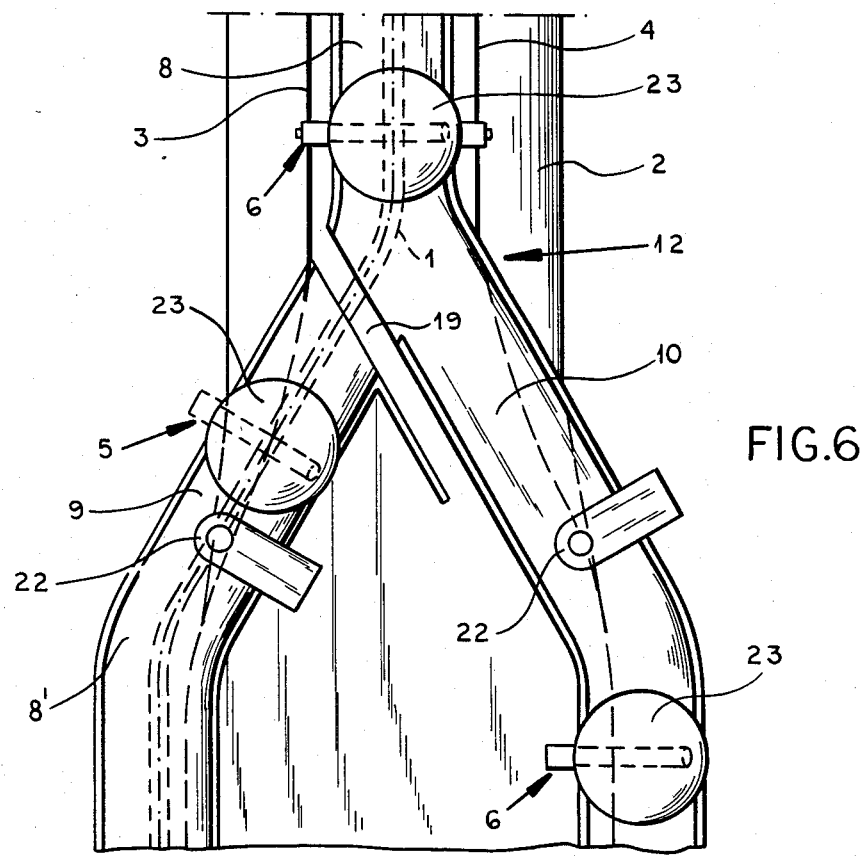
FIG. 6 is a large-scale view of the detail indicated at IIIA in FIG. 3, but with the deflector removed for clarity of view.
Figure 10:
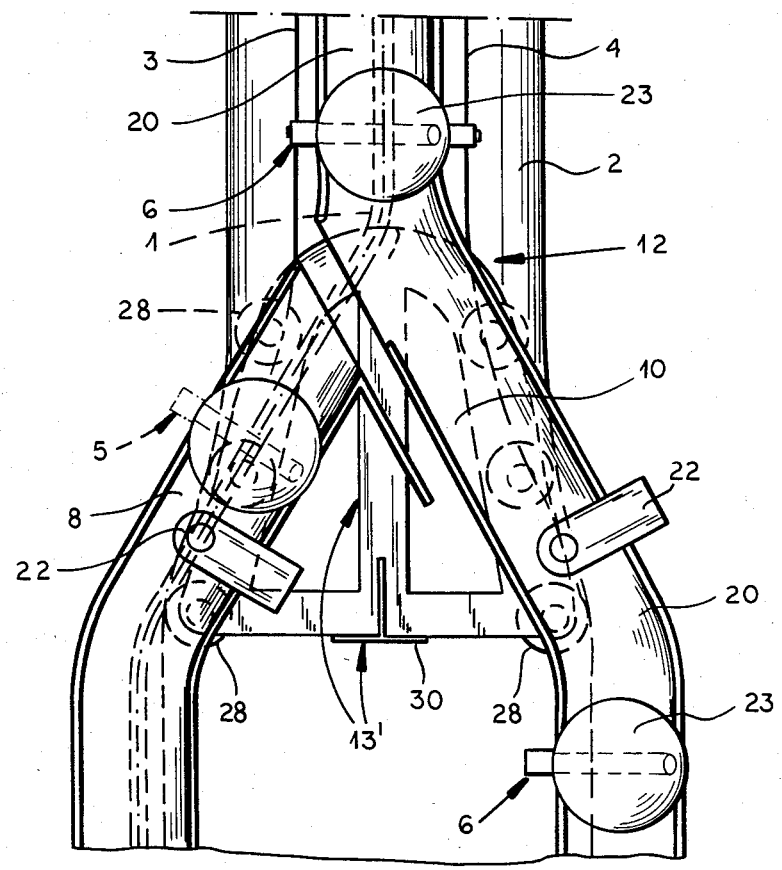

The manner in which the rail 8 splits upstream of the loading and unloading zones B and E is identical and is shown in detail in FIG. 6. In both situations as seen in some detail in FIGS. 3, 3A, and 3B also a deflector 13 is provided in a Y-intersection or fork 12 having a single input connected to the rail 8 and two outputs connected to the branch rails 9 and 10, which are identical in construction in the loading zone B as in the transport zone T. The upstream Y-intersection 12 is split at 19 parallel to the left-hand branch 10 so that the hangers 20 can move along this branch and a similar split is provided at the other end of the loading and unloading zones. This split 19 is so narrow that it does not interfere with a ball 23 rolling in to the branch 9. In the unloading zone E the rails 9' and 10' are somewhat differently constructed but not in a manner relevant to the instant invention.

The deflector 13 here is a fork pivoted about an upright axis at the cleft in the Y-intersection 12 between the branches 9 and 10. This Y shaped element 13 has a central leg 15 that extends upstream from the axis 14 relative to the displacement direction D and that can swing from the FIG. 3A position blocking the trucks 5 and 6 from rolling from the main rail 8 onto the branch 10 to an opposite position shown in FIG. 3B blocking them from entering the branch 9. The fork 13 also has downstream of its pivot 14 two arms 16 and 17 which can extend across the branches 9 and 10. The arm 16 extends across the branch 9 when the leg 15 is blocking the entrance of the branch 10 and the arm 17 extends across the branch 10 when the leg 15 is blocking the entrance of the branch 9.

Thus assuming the system is in the position of FIG. 3A, as a roller 23 moves from the rail 8 into the Y-intersection 12 it will be forced by the leg 15 into the branch 9 where it will engage the arm 16 and pivot the deflector 13 about the axis 14 into the position of FIG. 3B. When the next roller 23 comes to the fork 12 it will be deflected into the branch 10 and will pivot the deflector 13 back into the FIG. 3A position. In this manner relative to the transport direction D all the trucks 5 of the right-hand edge 3 are deflected into the right-hand branch 9 and all the left-hand trucks 6 of the edge 4 are deflected into the left-hand branch 10, opening up the belt 2. This alternate feeding is perfectly automatic and virtually failure-proof.

In the arrangement of FIGS. 7-10 structure identical to that of FIGS. 1-6 is assigned the same reference numerals. Here, however, a deflector 13' is employed which does not engage the trucks 5 and 6 like the deflector 13, but engages the belt 2 adjacent the edges 3 and 4. This deflector 13' comprises a wedge 27 supported by a beam 30 on the support 11 and carrying rollers 28 that ride against polytetrafluoroethylene inserts 29 inside the tube 2. Thus relative to the transport direction D as a right-hand truck 5 approaches this wedge 27 it will be urged to the right as the rollers 28 on that side of the wedge 27 press against the inside of the tube 2 adjacent the right-hand edge 3 thereof. Similarly a left-hand truck 6 is urged to the left. In this manner the belt 2 is opened up to receive or dump a load.

FIG. 11 shows how, in order to drive the trucks 6 as well as the trucks 5 in the loading zone B it is possible to deflect the drive element 1 back and up by a downstream wheel 31a rotatable about a generally vertical axis at the downstream end of the branch 9, then down by wheels 31b rotatable about superposed horizontal axes, and then back along the branch 10 by means of a wheel 31c. This length of the path from the wheel 31a to the wheel 31c is calculated to keep the pushers 26 just behind the arms 24 in both branches 9 and 10.

We claim:

1. A conveyor for transporting bulk material mainly underground along a closed path traversing at least one loading or unloading zone, the conveyor comprising:
   a track on the path and including
      a one-level main rail following the path outside the zone and having ends at the zone,
      respective one-level Y-intersections at the zone each having a central leg connected to the respective rail end and right and left arms extending into the zone, and
      respective right and left rail branches at the zone extending from the right and left arms of the one Y-intersection to the right and left arms of the other intersection and spaced apart transversely of the path, the rail branches being of construction similar to the main rail;
   an endless conveyor belt extending along the path and through the zone and having right and left longitudinal edges;
   respective endless rows of longitudinally spaced right and left trucks alternating with one another along the path and each having a lower end attached to the respective belt edge and an upper end riding on and displaceable longitudinally in the main rail, the trucks all being of substantially the same vertical dimension and of generally identical construction;
   an endless and flexible tension-transmitting drive element extending along the path and through the zone and connected at least indirectly to the belt and trucks;
   drive means connected to the drive element for advancing the belt and trucks along the path in a transport direction; and
   deflector means at, relative to the transport direction, the upstream Y-intersection for forcing the right trucks into its right arm and and thence into the right branch and for forcing the left trucks into its left arm and thence into the left branch, the belt being closed and tubular outside the zone when its right and left trucks are all in the main rail and being open in the zone when the right trucks are in the right branch and the left trucks are spaced therefrom in the left branch.

2. The bulk-material belt conveyor defined in claim 1 wherein the deflector means includes a deflector element displaceable between a left position blocking the left arm of the upstream intersection and a right position blocking the right arm thereof.

3. The bulk-material belt conveyor defined in claim 2 wherein the deflector element is engageable by the trucks in the arms of the upstream intersection.

4. The bulk-material belt conveyor defined in claim 3 wherein the deflector element is pivotal about an axis transverse to the path at the intersection and has
   an upstream deflector flap pivotal between the left and right positions; and
   right and left downstream deflector tabs, the right flap extending across the right arm of the intersection when the upstream flap is in the left position and the left flap extending across the left arm of the intersection when the upstream flap is in the right position.

5. The bulk-material belt conveyor defined in claim 4 wherein the pivot axis lies between the arms of the upstream intersection and immediately downstream of the leg thereof.

6. The bulk-material belt conveyor defined in claim 1 wherein the rail, the central legs of the intesections, and the arms of the intersection are all of upwardly open U-section.

7. The bulk-material belt conveyor defined in claim 1 wherein the right and left trucks include:
   respective generally C-shaped right and left hangers each having the respective upper and lower ends; and
   respective rollers rotatable on the upper ends about generally horizontal axes and riding in the main rail outside the zone, the rollers all being in line without substantial transverse spacing in the main rail outside the zone.

8. The bulk-material belt conveyor defined in claim 7 wherein the rollers are balls and the main rail is of upwardly open U-section of the same radius of curvature as the balls.

9. The bulk-material belt conveyor defined in claim 7 wherein the C-shaped hangers are all open horizontally toward one of the right and left edges, the conveyor further comprising:

suspenders extending upwardly from and supporting the main rail and branches on the side thereof above the one edge toward which the C-shaped hangers are open, whereby the hangers can move past the suspenders.

10. The bulk-material belt conveyor defined in claim 7 wherein the belt is flexible but stiff and the right hangers extend down and to the right from the respective rollers and the left hangers extend down and to the left from the respective rollers, the lower ends of the left hangers being spaced horizontally to the left relative to the direction from the lower ends of the right hangers outside the zone.

11. The bulk-material belt conveyor defined in claim 10 wherein the deflector means includes a splitter between the arms of the upstream intersection and positioned below the rail generally between the edges of the belt.

12. The bulk-material belt conveyor defined in claim 11 wherein the splitter is a wedge pointed horizontally upstream and having right and left flanks generally under the right and left arms of the upstream intersection.

13. The bulk-material belt conveyor defined in claim 12 wherein the right and left flanks are immediately underneath the respective right and left belt edges and are engageable with the belt thereat.

14. The bulk-material belt conveyor defined in claim 13 wherein the right and left flanks are provided with roller elements engaging the belt.

15. The bulk-material belt conveyor defined in claim 13 wherein the belt is provided on its inside underneath each of its edges with a wear-resistant bumper strip engaging the respective wedge flank.

16. The bulk-material belt conveyor defined in claim 1 wherein the track includes guides formed with generally downwardly directed slots, the drive element being received in these guides and having respective entrainment elements engageable through the respective slots with the trucks.

17. The bulk-material belt conveyor defined in claim 16 wherein one of the branches is provided with such guides, whereby the drive element engages the trucks of this one branch.

18. The bulk-material belt conveyor defined in claim 17, further comprising means for guiding the drive element from the downstream end of the one branch to the upstream end of the other branch and thence therealong to the downstream intersection, whereby the drive element engages the trucks in both branches.

19. The bulk-material belt conveyor defined in claim 18 wherein the guiding means includes deflector wheels over which the drive element is looped.

* * * * *